June 8, 1926.
W. H. KADESCH
1,587,778
POWER TRANSMISSION DEVICE
Filed March 9, 1925
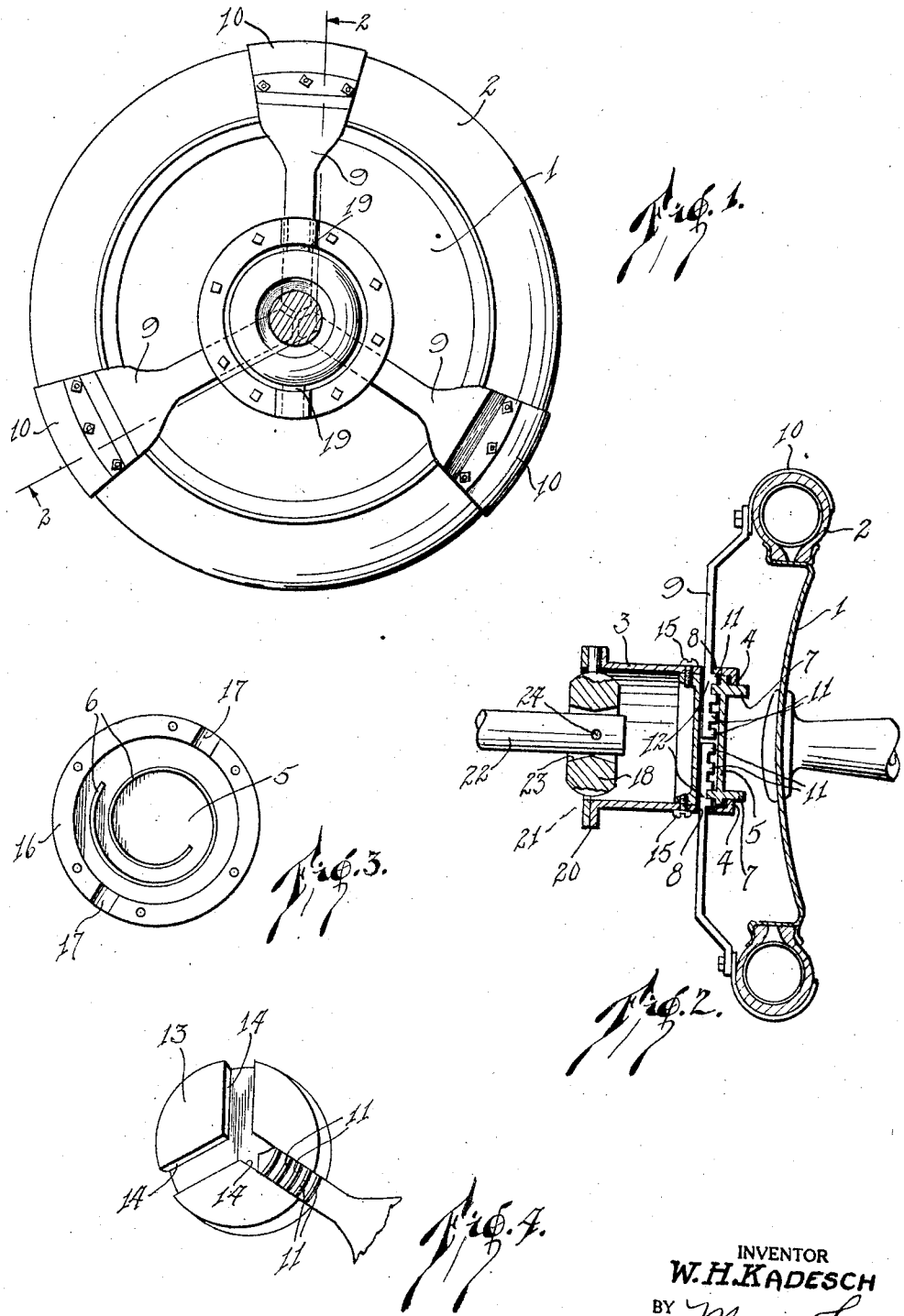
INVENTOR
W. H. KADESCH
BY
ATTORNEYS Patented June 8, 1926.

1,587,778

UNITED STATES PATENT OFFICE.

WILLIAM H. KADESCH, OF CEDAR FALLS, IOWA.

POWER-TRANSMISSION DEVICE.

Application filed March 9, 1925. Serial No. 14,193.

My invention relates to improvements in power transmission devices, and it consists in the combinations, constructions, and arrangements herein described and claimed.

An object of my invention is to provide a device of the character described for transmitting power from the rear wheel of a motor vehicle to a shaft, for the actuation of stationary machinery and the like, and in which particularly novel means is employed for detachably connecting the power transmitting device with one of the rear wheels of the vehicle.

A further object of my invention is to provide a device of the character described which is so constructed as to maintain the primary drive shaft of the device in substantial axial alignment with the axis of the rear wheel to which the device is attached.

A further object of my invention is to provide a device of the character described in which means is provided for automatically moving the clamping plates associated with the primary drive shaft simultaneously into engagement with the peripheral edges or tire tread of the wheel, and in which more than two clamping plates may be used.

A further object of my invention is to provide a device of the character described which is simple in construction, durable, and thoroughly practical for the purpose intended.

Other objects and advantages will appear in the following specification, and the novel features of the invention will be particularly pointed out in the appended claim.

My invention is illustrated in the accompanying drawings forming part of this application, in which:—

Figure 1 is a front elevation of an embodiment of my invention,

Figure 2 is a sectional view along the line 2—2 of Figure 1,

Figure 3 is a perspective view of a part of the mechanism illustrated in Figure 1 with a portion thereof broken away, and Figure 4 is a front view of other parts of the mechanism illustrated in Figure 1.

In carrying out my invention I make use of a motor vehicle having a rear wheel 1 and a tire 2 carried upon the peripheral rim of the wheel. This wheel is jacked up free of the ground so that it may rotate freely when the engine of the vehicle is in operation.

My improved power transmitting device consists in a tubular primary drive shaft 3. This tubular shaft 3 has an inwardly extending radial flange 4 at one end thereof, against which a cam disk 5 rests and serves to virtually close that end of the shaft. The cam disk 5 has a spiral cam 6 formed on the inner face thereof which projects perpendicularly therefrom. A pair of rearwardly extending projections 7 are provided on the rear wall of the cam disk 5 by means of which the disk may be manually rotated within the shaft 3 and on the axis thereof.

Three equally spaced apart rectangular openings 8 are provided through the side walls of the shaft 3, in registration with the plane of the cam 6.

Three clamping plates 9 are provided each having driving members 10 at the outer end thereof for engaging with and gripping the tread of the tire 2. The inner ends of the clamping members 9 have segmental threads 11 thereon which are adapted to engage with the cam 6 when the reduced portions 12 of the clamping plates 9, which bear the threads 11, are projected through the openings 8.

A guide block 13 is provided and has three radial grooves 14 on one face thereof which merge at their inner ends with one another and which are each adapted to encompass the reduced portion 12 of the clamping members 9. The plate 13 is held in place by screws 15 which are projected through the wall of the shaft 3, and into the plate 13. Thus the threads 11 on the reduced portion 12 and clamping plates 9 are held in constant engagement with the cam member 6, and rotation of the cam member, as by gripping of the projection 7, will cause the clamping members 9 to move simultaneously radially to or from the center of the shaft 3, depending upon the direction of rotation of the disk 5.

The outer end of the shaft 3 has an outwardly extending radial flange 16, in which diametrically opposed bearing members 17 are formed.

A universal joint 18, having trunnions 19, is rotatably mounted upon the shaft 3 by introduction of the trunnions 19 to the bearing members 17 and by the disposition of a retaining ring 20 upon the flange 16 by means of bolts 21. A secondary drive shaft 22 is projected through an opening 23 in the universal joint member 18 and is held against longitudinal movement relative to the member 18 by means of a locking pin 24.

The secondary shaft 22 is connected to whatever mechanism it is desired to drive from the vehicle wheel 1.

From the foregoing description of the various parts of the device the operation thereof may be readily understood. Prior to employing my improved power transmitting device it is necessary to jack up the rear wheel of the motor vehicle. This is done in the usual manner, and sufficient clearance should be left between the tire and the ground for the introduction of the gripping members 10 of the clamping plates.

The operator should then rotate the cam disk 5 by means of the projection 7 so as to cause the clamping plates 9 to move outwardly from the shaft 3 and thus permitting the driving members 10 to be placed concentric with and into engagement with the tread of the tire 2. The clamping disk 5 is then rotated so as to draw the clamping members 9 toward the shaft 3. For this operation a spanner wrench should be employed, or some form of lever introduced between the projections 7 of the disk so that the disk may be moved with sufficient force to cause the gripping members 10 to tightly grip the tire tread.

It will be noted that as the disk 5 is rotated, the cam 6, which engages with the threads 11 of the clamping members will cause the clamping members to move simultaneously through equal distances, thus maintaining the shaft 3 concentric with the shaft of the wheel 1.

The engine may then be started, and power derived by connection of the shaft 22 with the machine or machinery which is to be driven.

The purpose of introducing the universal joint between the shaft 3 and the shaft 22 is to obviate the necessity of special care and skill in the construction and alignment of bearing members for the shaft 22.

I claim:—

The combination with a driven vehicle wheel having a tread portion, of a primary drive shaft, a plurality of gripping members extending radially from said primary shaft, a disc rotatably mounted within said primary shaft and arranged to turn on the axis thereof, a pair of rearwardly extending gripping projections formed on said disc at that side thereof facing the vehicle wheel, a spiral cam carried by said disc, and segmental threads disposed upon the inner ends of said gripping members and engaging with the cam on said disc, whereby rotation of the disc as by engagement of a bar or the like with said projections will move said gripping members radially toward or away from said primary shaft.

WILLIAM H. KADESCH.